3,088,838
METHOD FOR PRODUCING CLEAR AQUEOUS POLYETHYLENE OXIDE SOLUTIONS
William R. Woodard, Moulton, and Paul R. Cox, Jr., Decatur, Ala., assignors, by mesne assignments, to Monsanto Chemical Company, a corporation of Delaware
No Drawing. Filed July 18, 1960, Ser. No. 43,311
11 Claims. (Cl. 106—287)

This invention relates to the clarification of polyethylene oxide solutions and to the composition obtained thereby. More particularly, the invention relates to a method for effective removal of colloidal and clouding materials from solutions of polyethylene oxide.

It is well known that ethylene oxide may be polymerized to a variety of useful products which range from oily liquids to wax-like solids, depending on the degree of polymerization. Regardless of the process employed in the polymerization of ethylene oxide compounds, a certain amount of cloudiness has frequently arisen, which is detrimental in the preparation of films and other shaped articles. Also polyethylene oxide solutions are useful in light stabilization, dye promotion, coagulation control and textile softening. For these purposes a clear solution is necessary. In addition, a colloidal or morbid appearance usually indicates that the components are incompatible and an incompatible dope mixture may cause lamination or fibrillation of the fibers. A synthetic fiber or film made from a dope containing a colloidal solution of polyethylene oxide may also be streaked when dyed. None of these problems would be encountered if a clear polyethylene oxide were used. The material causing this turbid effect remains suspended in a colloidal form when a solution of polyethylene oxide is prepared, and it is extremely difficult, if not impossible to remove this colloidal suspension by ordinary filtration or other methods usually employed for such purposes since the material consists substantially of an undissolved suspensoid of polyethylene oxide.

Accordingly, it is an object of the present invention to provide a method for the clarification of polyethylene oxide solutions. It is another object of the invention to provide clear aqueous solutions of polyethylene oxide. Other objects will be apparent from the description of the invention hereinafter.

In accordance with this invention it has been found that the addition of small quantities of an aqueous solution of glyoxal to aqueous solutions of polyethylene oxide makes the cloudy colloidal appearing solution become clear. The aqueous solutions may contain from 10 to 50 percent glyoxal, based on the total weight of the solution. The amount of aqueous glyoxal necessary to clarify a given polyethylene oxide solution will vary with the concentration of glyoxal and polyethylene oxide employed. In general from 0.1 percent to 1.0 percent, based on the total weight of the polyalkylene oxide solution, will usually clarify most polyalkylene oxide solutions. Preferably from about 0.125 to 0.5 percent by weight may be used for solutions for making films and the like. The concentration of polyethylene oxide in solution may vary from 2 to 85 percent by weight, based on the total weight of the composition. It is preferred to employ from about 2 to 25 percent polyethylene oxide by weight when the polyethylene oxide is to be used for films, plasticizers, adhesives and the like.

This invention is also applicable to polyethylene oxide blended with other polyalkylene oxides such as polypropylene oxide, polyisopropylene oxide and polybutylene oxide.

In the preferred practice of this invention the aqueous glyoxal is added to the polyethylene oxide solution dropwise with stirring until the cloudy appearance is dissipated. The polyethylene oxide solution may be heated slightly to about 30° C. prior to the addition.

It is desirable and preferable to employ glyoxal in the form of an aqueous solution since glyoxal is commercially available only in solution form. This is probably due to the fact that glyoxal is highly deliquescent and has a tendency to polymerize on standing.

The following examples are intended to illustrate the process and new compositions of the invention more fully but are not intended to limit the scope of the invention, for it is possible to effect many modifications therein. In the examples all parts and percents are by weight unless otherwise indicated.

*Example I*

98 grams of water and 2 grams of polyethylene oxide were mixed at 30° C. for 2 hours. The resulting solution was cloudy and colloidal in appearance. Two drops (approximately 0.125 gram) of 30 percent aqueous glyoxal solution were added with stirring whereupon the polyethylene oxide solution became clear and transparent.

*Example II*

95 grams of water and 5 grams of polyethylene oxide were prepared as in Example I. 0.125 gram of 30 percent aqueous glyoxal solution caused the colloidal appearing solution to clear up.

*Example III*

50 grams of water and 50 grams of a polyethylene oxide-polypropylene oxide mixture containing 40 percent to 50 percent polyethylene oxide were mixed for one minute at 30° C. The resulting solution was cloudy and turbid in appearance. This solution became clear when 0.125 gram of 30 percent aqueous glyoxal solution was added.

*Example IV*

25 grams of water and 75 grams of a polyethylene oxide-polypropylene oxide mixture containing 20–30 percent polyethylene oxide were mixed resulting in a cloudy viscous solution. The solution became clear on the addition thereto of 0.5 gram of 30 percent aqueous glyoxal.

As many variations of this invention may be made without departing from the spirit and scope thereof it is intended that the invention be limited solely by the scope of the appended claims.

We claim:

1. A method of clarifying aqueous solutions of polyethylene oxide which consists of adding to an aqueous solution consisting of from 2 to 85 parts polyethylene oxide and 15 to 98 parts water from 0.1 to 1.0 part of an aqueous solution of glyoxal, comprising from 10 to 50 percent glyoxal based on the total weight of the aqueous solution of glyoxal, and stirring until the solution becomes clear.

2. A method of clarifying aqueous solutions of polyethylene oxide which consists of adding to an aqueous solution consisting of from 2 to 25 parts polyethylene oxide and 75 to 98 parts water from 0.1 to 1.0 part of an aqueous solution of glyoxal comprising from 10 to 50 percent glyoxal based on the total weight of the aqueous solution of glyoxal, and stirring until the solution becomes clear.

3. A method of clarifying aqueous solutions of polyethylene oxide which consists of adding to an aqueous solution consisting of from 2 to 85 parts polyethylene oxide and 15 to 98 parts water from 0.125 to 0.5 part of an aqueous solution of glyoxal comprising from 10 to 50 percent glyoxal, based on the total weight of the aqueous solution of glyoxal, and stirring until the solution becomes clear.

4. A method of clarifying aqueous solutions of polyethylene oxide which consists of adding to an aqueous solution consisting of from 2 to 85 parts polyethylene oxide and 15 to 98 parts water from 0.1 to 1.0 part of an aqueous solution of glyoxal comprising from 20 to 40 percent glyoxal based on the total weight of the aqueous solution of glyoxal, and stirring until the solution becomes clear.

5. A method of clarifying aqueous solutions of polyethylene oxide which consists of adding to an aqueous solution consisting of 2 parts of polyethylene oxide in 98 parts of water, from 0.1 to 1.0 part of an aqueous solution of glyoxal, containing 30 percent glyoxal, based on the total weight of the aqueous glyoxal solution, and stirring until the solution becomes clear.

6. A method of clarifying aqueous solutions of polyethylene oxide which consists of adding to an aqueous solution consisting of 5 parts of polyethylene oxide in 95 parts of water, from 0.1 to 1.0 part of an aqueous solution of glyoxal containing 30 percent glyoxal, based on the total weight of the aqueous glyoxal solution, and stirring until the solution becomes clear.

7. A method of clarifying aqueous solutions of polyethylene oxide which consists of adding to an aqueous solution consisting of 50 parts of a polyethylene oxide-polypropylene oxide mixture containing 40 to 50 percent of polyethylene oxide in 50 parts in water, 0.125 part of an aqueous solution of glyoxal containing 30 percent glyoxal based on the total weight of the aqueous glyoxal solution, and stirring until the solution becomes clear.

8. A method of clarifying aqueous solutions of polyethylene oxide which consists of adding to an aqueous solution consisting of 75 parts of a polyethylene oxide-polypropylene oxide mixture containing 20 to 30 percent of polyethylene oxide in 25 parts of water, 0.5 part of an aqueous solution of glyoxal containing 30 percent glyoxal, based on the total weight of the aqueous glyoxal solution, and stirring until the solution becomes clear.

9. A new composition of matter consisting of an aqueous solution of from 2 to 85 parts by weight polyethylene oxide and 0.1 to 1.0 part by weight glyoxal.

10. A new composition of matter consisting of an aqueous solution of from 2 to 25 parts by weight polyethylene oxide and 0.125 to 0.5 part by weight glyoxal.

11. The composition of matter of claim 10 containing from 20 to 65 parts by weight polypropylene oxide.

References Cited in the file of this patent

UNITED STATES PATENTS 2,786,081     Kress  ---------------- Mar. 19, 1957